(12) United States Patent
Pekarek et al.

(10) Patent No.: US 8,813,020 B2
(45) Date of Patent: Aug. 19, 2014

(54) AUTOMATICALLY MODIFYING A CIRCUIT LAYOUT TO PERFORM ELECTROMAGNETIC SIMULATION

(71) Applicant: AWR Corporation, El Segundo, CA (US)

(72) Inventors: Joseph Edward Pekarek, Manhattan Beach, CA (US); Niranjana Sharma Doddamani, San Jose, CA (US)

(73) Assignee: AWR Corporation, El Segundo, CA (US)

( * ) Notice: Subject to any disclaimer, the term of this patent is extended or adjusted under 35 U.S.C. 154(b) by 0 days.

(21) Appl. No.: 13/740,195

(22) Filed: Jan. 12, 2013

(65) Prior Publication Data

US 2013/0191802 A1   Jul. 25, 2013

Related U.S. Application Data

(63) Continuation-in-part of application No. 13/723,773, filed on Dec. 21, 2012.

(60) Provisional application No. 61/586,513, filed on Jan. 13, 2012.

(51) Int. Cl.
*G06F 17/50* (2006.01)

(52) U.S. Cl.
USPC ........... 716/139; 716/118; 716/119; 716/120; 716/126; 716/132; 716/133; 716/134; 716/135; 716/136

(58) Field of Classification Search
USPC .......... 716/118–120, 126–127, 132–136, 139
See application file for complete search history.

(56) References Cited

U.S. PATENT DOCUMENTS

| | | |
|---|---|---|
| 5,034,091 A | 7/1991 | Trask et al. |
| 6,226,781 B1 | 5/2001 | Nistler et al. |
| 6,434,734 B1 | 8/2002 | Zahar |
| 6,782,524 B2 | 8/2004 | Rittman |
| 7,331,023 B2 | 2/2008 | Sercu et al. |

(Continued)

OTHER PUBLICATIONS

Pathak et al.; "Automatic Layout Generation of RF Embedded Passive Designs;" IEEE Topical Meeting on Electrical Performance of Electronic Packaging—EPEPS, Oct. 29-31, 2007; pp. 115-118.

(Continued)

*Primary Examiner* — Nghia Doan
(74) *Attorney, Agent, or Firm* — Meyertons Hood Kivlin Kowert & Goetzel, P.C.; Jeffrey C. Hood

(57) ABSTRACT

A system and method for automatically modifying a first layout of a circuit. The first layout may describe a plurality of layers used in a fabrication process to manufacture the circuit. When performed, the fabrication process may result in a vertical electrical connection between two of the layers. However, the vertical electrical connection may not be directly specified by the first layout. The system and method may operate to apply a set of rules to the first layout to automatically generate a modified layout directly specifying a vertical electrical connection between the two layers. The set of rules may be based on knowledge of the fabrication process, and may be designed to modify the geometry of the first layout to more closely model the real geometry of the circuit that will result from the fabrication process. The modified layout may enable an electromagnetic (EM) simulation of the circuit to be accurately performed.

18 Claims, 17 Drawing Sheets

(56) References Cited

U.S. PATENT DOCUMENTS

| | | |
|---|---|---|
| 7,496,862 B2 | 2/2009 | Chang et al. |
| 7,767,495 B2 | 8/2010 | Fuergut et al. |
| 8,051,400 B2 | 11/2011 | Frederick |
| 8,086,991 B1 | 12/2011 | Pekarek |
| 8,158,514 B2 | 4/2012 | Kruger et al. |
| 8,203,207 B2 | 6/2012 | Getz et al. |
| 8,209,161 B2 | 6/2012 | Zhu |
| 8,361,594 B2 | 1/2013 | Gardner et al. |
| 8,438,519 B2 * | 5/2013 | Park .................. 716/115 |
| 2008/0086708 A1 * | 4/2008 | Rittman ................ 716/11 |
| 2009/0178013 A1 * | 7/2009 | Wang et al. ........... 716/2 |
| 2010/0037197 A1 * | 2/2010 | Fukunaga ............. 716/12 |

OTHER PUBLICATIONS

"Hyperlynx 3D EM: Datasheet," Mentor Graphics, 2011, retrieved from <http://www.mentor.com/products/pcb-system-design/circuit-simulation/upload/hyperlynx-3d-em.pdf> on Feb. 22, 2013; pp. 1-2.

\* cited by examiner

AUTOMATICALLY MODIFYING A CIRCUIT
LAYOUT TO PERFORM
ELECTROMAGNETIC SIMULATION

PRIORITY DATA

This application claims benefit of priority to U.S. Provisional Application Ser. No. 61/586,513, titled "Automatically Modifying a Circuit Layout to Perform Electromagnetic Simulation", filed Jan. 13, 2012, whose Inventors were Joe Pekarek and Niranjana Doddamani, which is hereby incorporated by reference in its entirety as though fully and completely set forth herein.

This application is also a continuation-in-part of U.S. patent application Ser. No. 13/723,773 titled "Automatically Modifying a Circuit Layout to Perform Electromagnetic Simulation", filed on Dec. 21, 2012, which claims benefit of priority to U.S. Provisional Application Ser. No. 61/586,513, titled "Automatically Modifying a Circuit Layout to Perform Electromagnetic Simulation", filed Jan. 13, 2012, whose Inventors were Joe Pekarek and Niranjana Doddamani, both of which are hereby incorporated by reference in their entirety as though fully and completely set forth herein.

FIELD OF THE INVENTION

The present invention relates to the field of circuit simulation, and more particularly to a system and method for automatically modifying a circuit layout to perform electromagnetic circuit simulation.

DESCRIPTION OF THE RELATED ART

One of the steps in the process of designing a circuit is known as physical verification. Physical verification may include performing an electromagnetic (EM) simulation of the circuit to help ensure, before the circuit is actually manufactured, that the circuit will electrically operate as intended. The software that performs the EM simulation typically receives a layout of the circuit as input and performs the simulation based on the layout. The layout is specific to the particular fabrication process which will be used to manufacture the circuit. More specifically, the layout describes the layers which are applied to the wafer in a step-by-step process to fabricate the circuit. Each layer may have a planar geometric shape which has some thickness. Some layers may represent a material to be applied to the circuit wafer, such as metal or dielectric material. Other layers may be masking layers used to define areas of the wafer in which a process is to be applied. For example, some fabrication processes use photolithography techniques involving the use of a material called photoresist (PR) to generate a specific pattern on the surface of the wafer. Photoresist is a light-sensitive material which can be processed into a specific pattern after being exposed to light energy in the shape of the desired pattern. Chemical processing may be performed to remove PR only where it has been exposed to light. Subsequent process steps may then affect only the uncovered areas where there is no PR.

Because of the high complexity of the layouts of these circuits, conventional simulators can take an exceedingly long time to perform EM simulation. In addition, it may be hard to achieve an accurate EM simulation using a circuit layout. Accordingly, improved methods for performing an EM simulation of a circuit are desired.

SUMMARY OF THE INVENTION

Various embodiments of a system and method for automatically modifying a first layout of a circuit are described. According to some embodiments, the first layout of the circuit may be received, e.g., by a computer system configured to perform the automatic modification. The first layout may describe a plurality of layers used in a fabrication process to manufacture the circuit. When performed, the fabrication process may result in a vertical electrical connection between a first layer and a second layer of the plurality of layers. However, the vertical electrical connection may not specified by the first layout.

The computer system may be configured to apply a set of rules to the first layout to automatically generate a modified layout that specifies the vertical electrical connection between the first layer and the second layer. For example, the set of rules may operate to add a vertical interconnect access (via) to the first layout, where the via specifies the vertical electrical connection between the first layer and the second layer. In some embodiments, adding the via to the first layout may comprise adding a new layer to the plurality of layers, where the new layer represents the via. In some embodiments, adding the via may comprise automatically determining a region where the first layer overlaps the second layer, and adding the via at the overlapping region. In some embodiments, multiple vias may be added to the first layout, e.g., where each one represents a respective electrical connection between two or more layers.

The computer system may store the modified layout, e.g., in the form of one or more files or databases. The modified layout may enable an electromagnetic (EM) simulation of the circuit to be performed.

In further embodiments, the set of rules used to modify the first layout may be a particular set of rules in a plurality of sets of rules. Each of the sets of rules may correspond to a different fabrication process. The computer system may be configured to automatically determine that the first layout is targeted to a particular fabrication process, and to select the particular set of rules from the plurality of sets of rules in response to determining that the particular set of rules corresponds to the particular fabrication process.

Further embodiments of the method may include creating the set of rules. Creating the set of rules may comprise: selecting each rule of the set of rules from a library; configuring one or more of the rules with one or more parameters; and storing information specifying that the set of rules corresponds to the fabrication process.

Further embodiments of the method may include performing an electromagnetic (EM) simulation of the circuit using the modified layout.

BRIEF DESCRIPTION OF THE DRAWINGS

A better understanding of the present invention can be obtained when the following detailed description of the preferred embodiment is considered in conjunction with the following drawings, in which.

Figure 1:
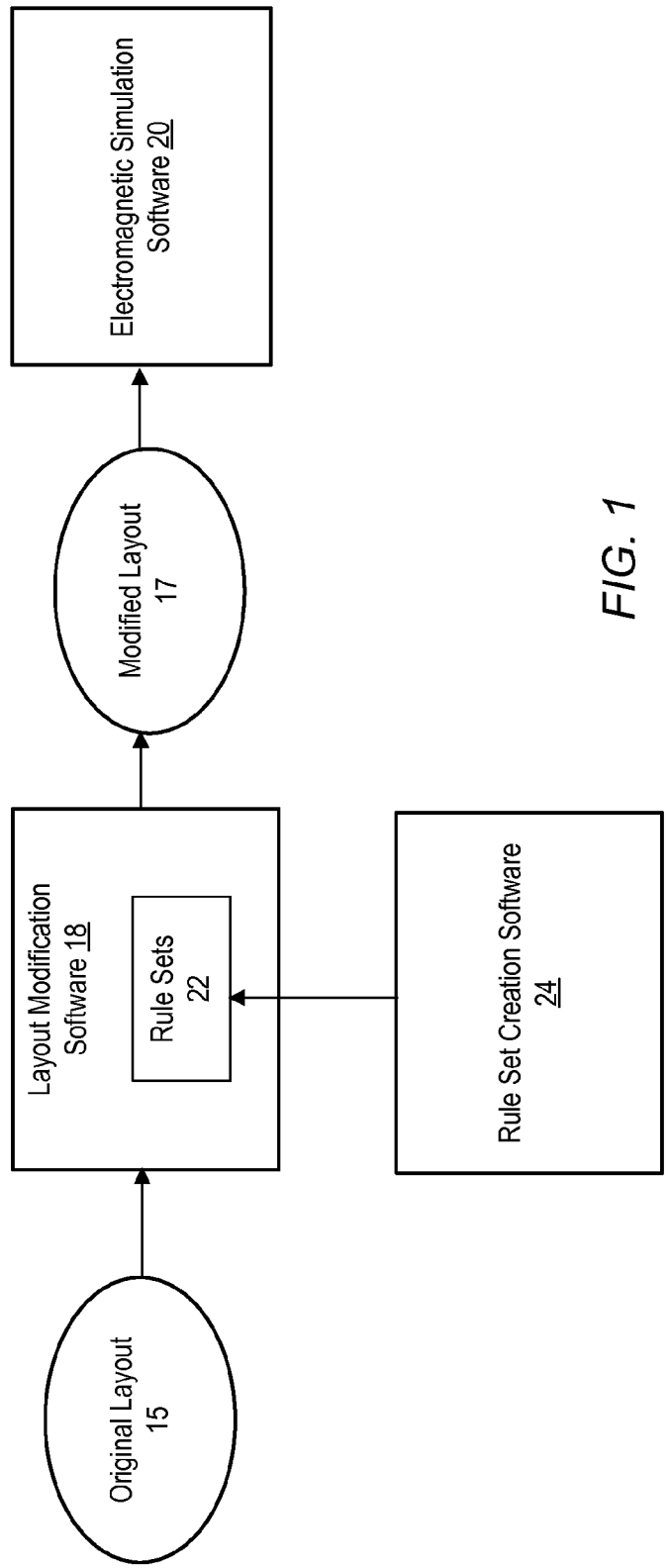
FIG. 1 illustrates components of a system configured to automatically modify a first layout of a circuit into a modified layout suitable for use by electromagnetic (EM) simulation software to perform an EM simulation of the circuit.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Provisional Application Ser. No. 61/586,513, titled "Automatically Modifying a Circuit Layout to Perform Electromagnetic Simulation", filed Jan. 13, 2012.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1 illustrates components of a system configured to automatically modify a first layout 15 of a circuit into a modified layout 17 suitable for use by electromagnetic (EM) simulation software 20 to perform an EM simulation of the circuit. The first layout may be specific to a particular fabrication process which will be used to manufacture the circuit. Examples of fabrication processes include gallium arsenide (GaAs) processes, other compound semiconductor processes, thick film processes, etc. The first layout may describe a plurality of layers used in the fabrication process. Each layer may be a flat layer which has an arbitrary geometric shape, and the layers may be vertically arranged in a planar manner parallel to each other according to the order in which they are used in the fabrication process. The first layout may describe the thicknesses of the layers, their vertical positioning with respect to each other, and their geometric shapes.

The first layout may not be suitable for direct use by the EM simulation software 20 because the geometric shapes described by the first layout may be very complex, which may result in the mathematical equations needed to model the first layout being time consuming and complicated to solve.

In addition, the first layout may not accurately specify the actual geometry of the physical circuit that will result from the physical fabrication process. The first layout essentially just shows the shapes and thicknesses of the layers and the order in which they are vertically arranged. However, when these layers are applied during the manufacturing process, their interaction with each other may result in a three-dimensional geometry that is significantly different from how the flat layers look when stacked on each other. As a result, the actual three-dimensional geometry of the physical circuit may be only indirectly related to the original geometry of the layers. As a simple example, a first layer may represent the shape of a metal layer to be applied to the wafer, and a second layer may represent the shape of an area to be etched out of the first metal layer. Thus, when used in the fabrication process, the interaction of these two layers may result in a physical geometry that is different from the logical shapes of the layers used to create that physical geometry. However, conventional EM simulators may not have enough knowledge of the fabrication process to be able to determine the actual physical geometry that will result when the circuit is fabricated. This may adversely affect the ability of a conventional EM simulator to perform an accurate EM simulation.

Figure 2:
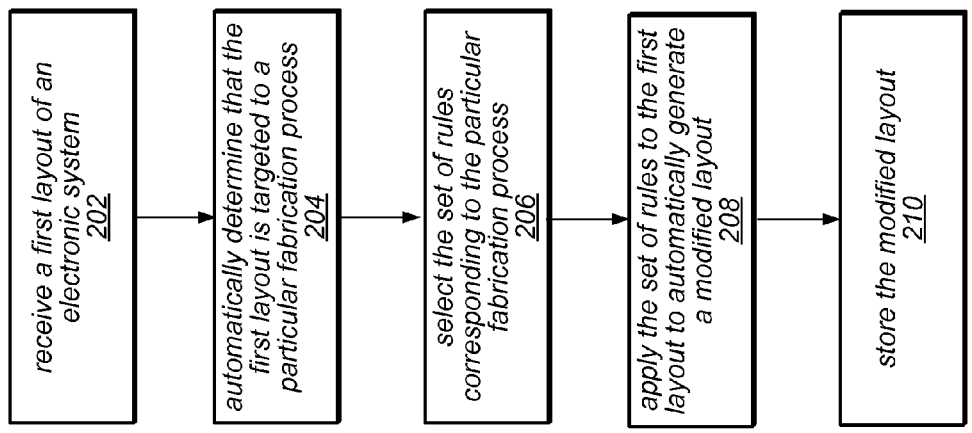
FIG. 2 is a flowchart diagram illustrating one embodiment of a method performed by layout modification software to automatically modify the first layout.

To address this issue, the system may use layout modification software 18 which is configured to operate according to the flowchart of FIG. 2. As indicated in block 202, the layout modification software 18 may receive the first layout. The layout modification software may then examine the first layout to automatically determine that the first layout is targeted to a particular fabrication process (block 204). For example, the first layout may be stored as information in the form of one or more files or database entries. The information may include information indicating that the circuit is targeted for manufacture at a particular foundry which uses that fabrication process.

As illustrated in FIG. 1, the layout modification software 18 may be configured with a plurality of sets of rules or commands 22. Each set of rules may correspond to a specific fabrication process and may specify a list of rules or commands to be applied to layouts targeted to the corresponding fabrication process in order to automatically modify the layouts into new layouts suitable for EM simulation. As indicated in block 18 of FIG. 2, the layout modification software 18 may select the set of rules corresponding to the particular fabrication process to which the first layout is targeted. The layout modification software 18 may then apply the set of rules to the first layout to automatically generate a modified layout 17 (block 208) and store the modified layout (block 210), e.g., in one or more files or databases. As shown in FIG. 1, the EM simulation software 20 may then receive the modified layout 17 and use it to perform an EM simulation of the circuit.

The set of rules which corresponds to a given fabrication process may be designed to be applied by the layer modification software 18 in order to automatically modify the geometry of the first layout in a step-by-step manner to achieve one or more of: a) simplification of the geometry to make the EM simulation less complex; and/or b) a more accurate model of the three-dimensional geometry of the physical circuit which will result from the fabrication process. The set of rules for a given fabrication process may be created by an engineer who has knowledge of that process and understands the actual physical geometry that will result from the interaction of the various layers used in the process. The rules may be designed to automatically modify the original first layout into a new layout in which the aggregation of the geometric shapes of the layers in the new layout has a three-dimensional geometry that is simple enough and close enough to the actual geometry of the physical circuit that will result from the fabrication process so as to enable an accurate EM simulation to be performed efficiently.

In particular, in some embodiments, the application of the set of rules may result in a modified layout which includes one or more vertical electrical connections that are not directly specified by the original first layout. For example, suppose that the first layout includes two metal layers, layer A and layer B, which are separated from each other by one or more intermediate dielectric layers. According to the geometry specified by the first layout, these may appear as planar layers which are separated from each other and have no electrical connection to each other. However, due to the interaction among the layers and the physical processes which will actually be performed when the layers are applied during the fabrication of the circuit, there may actually be an electrical connection between the layers in the resulting physical circuit. If the original first layout were used to simulate the circuit, the results of the simulation may be completely different from how the physical circuit actually operates due to the lack of electrical connection between layer A and layer B. Thus, one function of the set of rules may be to add one or more vertical electrical connections between these layers so that the simulation can be accurately performed.

In some embodiments the operation of the layout modification software 18 may be transparent to the end user who constructs the original first layout. For example, the layout modification software 18 may be included as a module within the user's layout editor software or within the EM simulation software 20 and may automatically modify the original layout without the end user even being aware that the modification has taken place. For example, the vendor of the layout editor software or EM simulation software may construct a plurality of sets of rules for different fabrication processes. Each set of rules may be constructed based on an engineer's knowledge of the respective process and may be designed to automatically transform an original layout targeted to that process into a modified layout that will result in a simplified and/or more accurate simulation. Before an EM simulation is performed, the set of rules corresponding to the targeted fabrication process may be automatically selected and applied in order to create the modified layout, possibly without the end user knowing how the original layout is being modified. In other embodiments, the sets of rules may also be exposed to the end user so that the end user can modify the set of rules for a given process if desired. Thus, the user may be able to customize the modification process, e.g., in order to correct for any issues or ensure accurate simulation.

Figure 3:
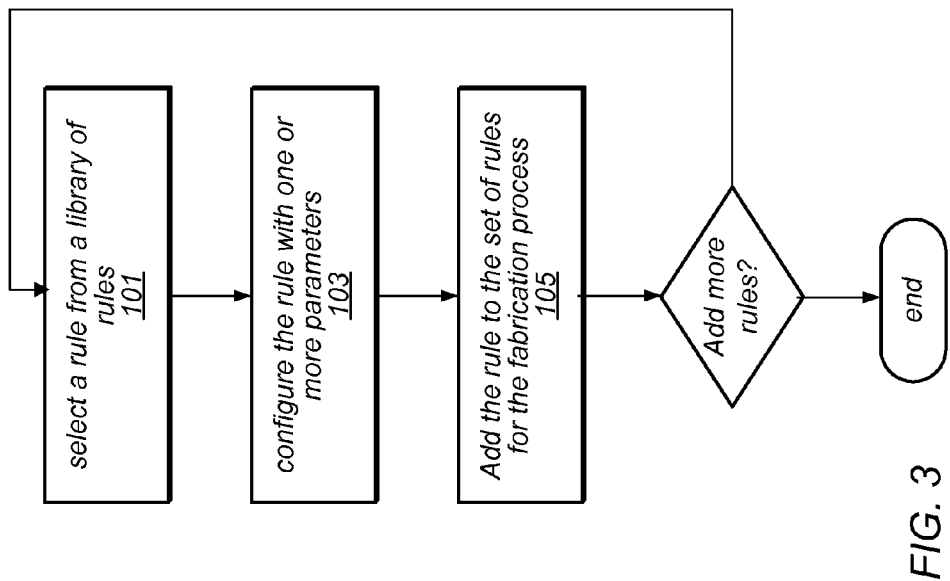
FIG. 3 is a flowchart diagram illustrating one embodiment of a method for creating a set of rules used by the layout modification software.

In some embodiments the sets of rules for a given fabrication process may be created using rule set creation software 24 which operates as shown in FIG. 3. A user (e.g., an engineer on the development team for the vendor of the layout editor software or EM simulation software) may select each rule from a library of rules (block 101) and configure the rule with one or more parameters (block 103). For example, the parameters may specify one or more layers on which the rule operates. For some rules, the parameters may also specify other information that affects the operation of the rule, such as size information regarding the size of a new shape that will be created by the rule. The selected rules may then be added to the set of rules for the fabrication process (block 105). After all the rules for the process have been defined, the set of rules may be stored (block 107). This general procedure may be done for multiple fabrication processes in order to create a plurality of sets of rules corresponding to the different fabrication processes.

The sets of rules created by the engineer on the software vendor's development team may subsequently be installed, e.g., in the form of one or more files or databases, on an end user's computer system along with the layout modification software, so that they are available for use by the layer modification software to automatically modify layouts created by the end user.

Each rule in a set of rules may comprise a rule or command to modify the layout in any of various ways. For example, a rule may create a new layer which is based on one or more of the existing layers in the layout. As one example, the rule may be configured with parameters specifying two existing layers and may operate to create a new layer representing the intersection or overlapping region(s) of these layers. As another example, the new layer could represent the difference or non-overlapping region(s) of the layers. As another example, a rule may make a copy of an existing layer, or may make a re-sized copy of an existing layer. As another example, a rule may change the geometric shape of a layer or replace the shape of one layer with the shape of another layer.

Applying the set of rules to the original layout may modify the geometry of the layout in a step-by-step manner to gradually achieve the final modified layout. As discussed above, the set of rules corresponding to each respective fabrication process may be designed based on an engineer's knowledge of what actually occurs during the fabrication process so that the modified layout which results has a geometry that accurately represents the real 3D geometry that will result from the fabrication process. An example of a specific set of rules which modifies a layout to add vertical electrical connections between two layers is described below.

In addition to adding one or more vertical electrical connections which were not specified by the original layout, a set of rules may also be designed to modify the original layout in various other ways. For example, the automatic modification may include removing features from the first layout which are unnecessary to perform accurate simulation. As another example, ports in the first layout may be moved from initial positions to different positions, e.g., to enable a simpler, but still accurate, simulation of the electronic system. In another embodiment, the shape of vertical interconnect accesses (vias) may be modified from a circular shape to a rectangular shape, which may be easier to simulate. Similarly, the general shapes of elements or groups of elements in the layout may be simplified (e.g., including several elements having a first complex shape to forming a single element with a simple shape). The modification may also include the addition of geometric shapes to the first layout, which may allow the simulation to be performed in a more efficient or accurate manner. Typically, the net result of the modification will be a reduction in the complexity of the EM simulation, even if new elements are added to the layout. Thus, the modifications may result in a simpler or more efficient simulation.

Figure 4:
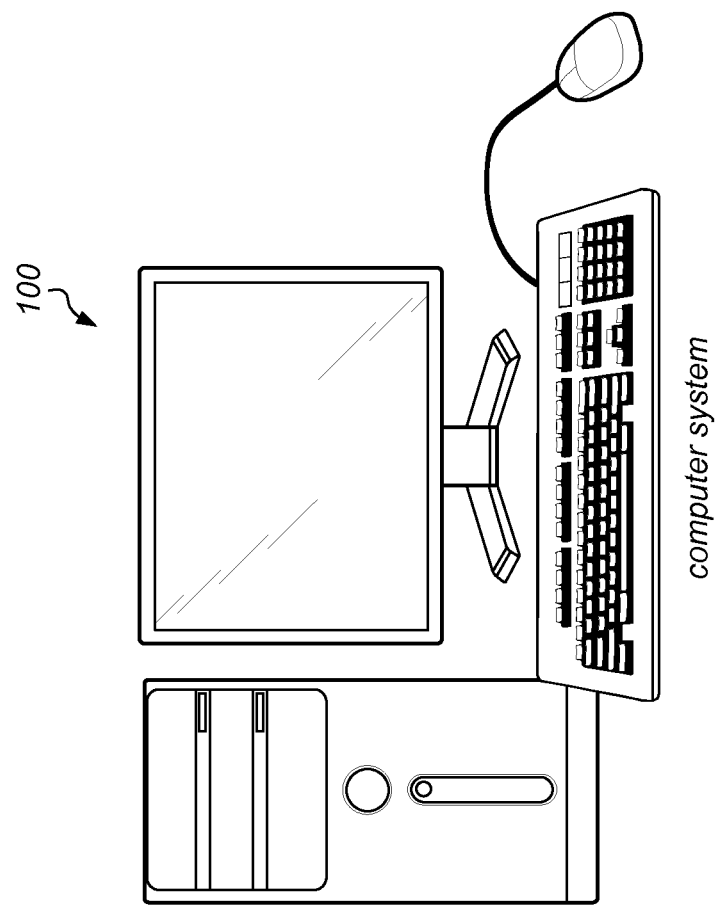
FIGS. 4 and 5 illustrate a computer system which may execute one or more of the software programs or components described herein.
Figure 5:
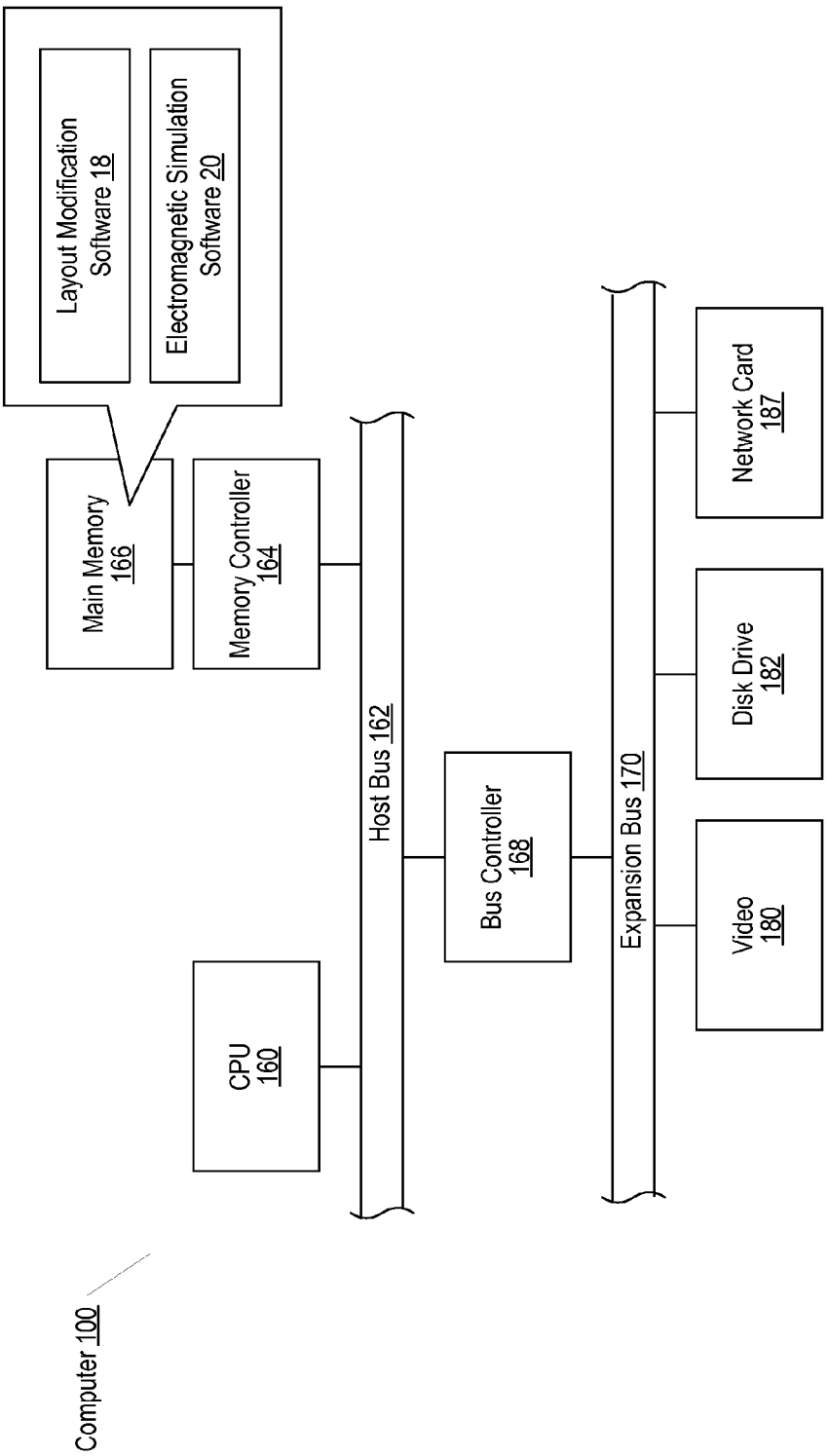

FIGS. 4 and 5 illustrate a computer system 100 which may execute one or more of the software programs or components described herein, such as the layout modification software 18, the EM simulation software 20, and/or the rule set creation software 24.

In general, the computer system 100 may include any kind of computing device(s), such as one or more personal computer systems (PC), workstations, network appliances, distributed computer systems, or other computing devices or combinations of devices. In general, the term "computer system" is broadly defined to encompass any device (or combination of devices) having at least one processor that executes instructions from one or more storage mediums. FIGS. 4 and 5 illustrate a representative PC embodiment. Elements of a computer not necessary to understand the present description have been omitted for simplicity.

The computer system 100 may include at least one central processing unit or CPU (processor) 160 which may be coupled to a processor or host bus 162. The processor 160 may be any of various types. For example, in some embodiments, the processor 160 may be compatible with the x86 architecture, while in other embodiments the processor 160 may be compatible with the SPARC™ family of processors. Also, in some embodiments the computer system 100 may include multiple processors 160.

The computer system 100 may also include memory 166 in which program instructions implementing software, such as layout modification software 18, EM simulation software 20, and/or rule set creation software 24 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the computer system 100. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, and a network card or device 187 that enables the computer system 100 to send and receive information over a network. A disk drive 182 may also be coupled to the expansion or input/output bus 170. The disk drive 182 may store the rule sets and/or the original and modified layouts of the circuit.

Figure 6A:
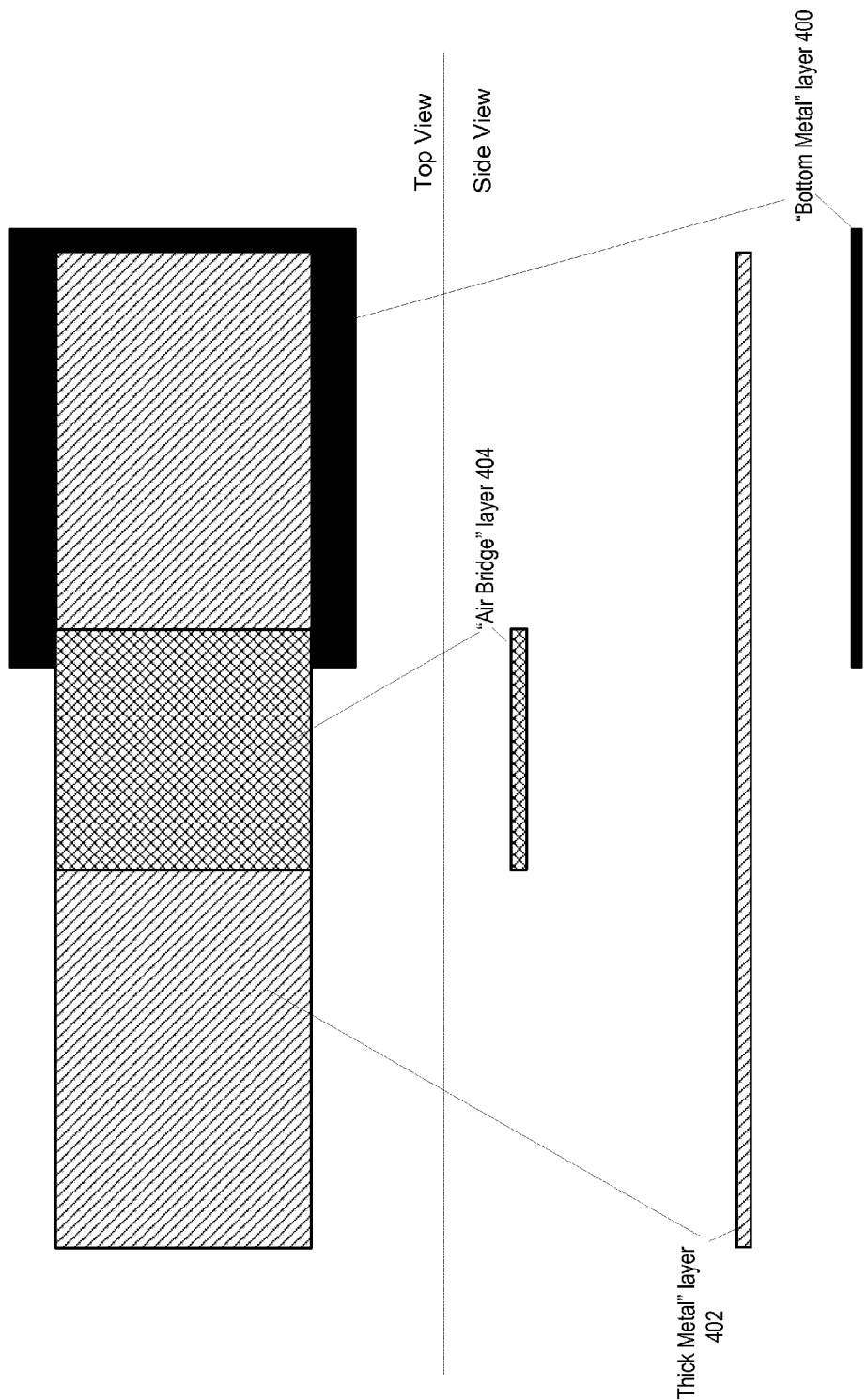
FIGS. 6A-6I illustrate an example of set of rule which, when applied to an original layout, operate to automatically produce a modified layout that includes two vertical interconnect accesses (vias) that were not specified in the original layout.

FIGS. 6A-6I illustrate an example of set of rules which, when applied to an original layout, operate to automatically produce a modified layout that includes two vertical interconnect accesses (vias) that were not specified in the original layout. FIG. 6A illustrates a top (overhead) view and side view of the original layout. As shown, the original layout includes three layers which are arranged as parallel planes with respect to each other without any electrical connections specified between the layers. However, in the actual circuit manufactured by the fabrication process, the Thick Metal layer may be electrically connected to the Air Bridge layer. To ensure that this electrical connection is accurately simulated, the set of rules may operate to produce the modified layout shown in FIG. 6I. As shown, a fourth layer (the "em_der_air_bridge_via" layer 414) has been added to the layout, which serves as vias electrically connecting the Thick Metal layer to the Air Bridge layer. The intermediate drawings 6B-6J illustrate the application of a specific set of rules to automatically achieve the modified layout in a step-by-step manner.

Figure 6B:
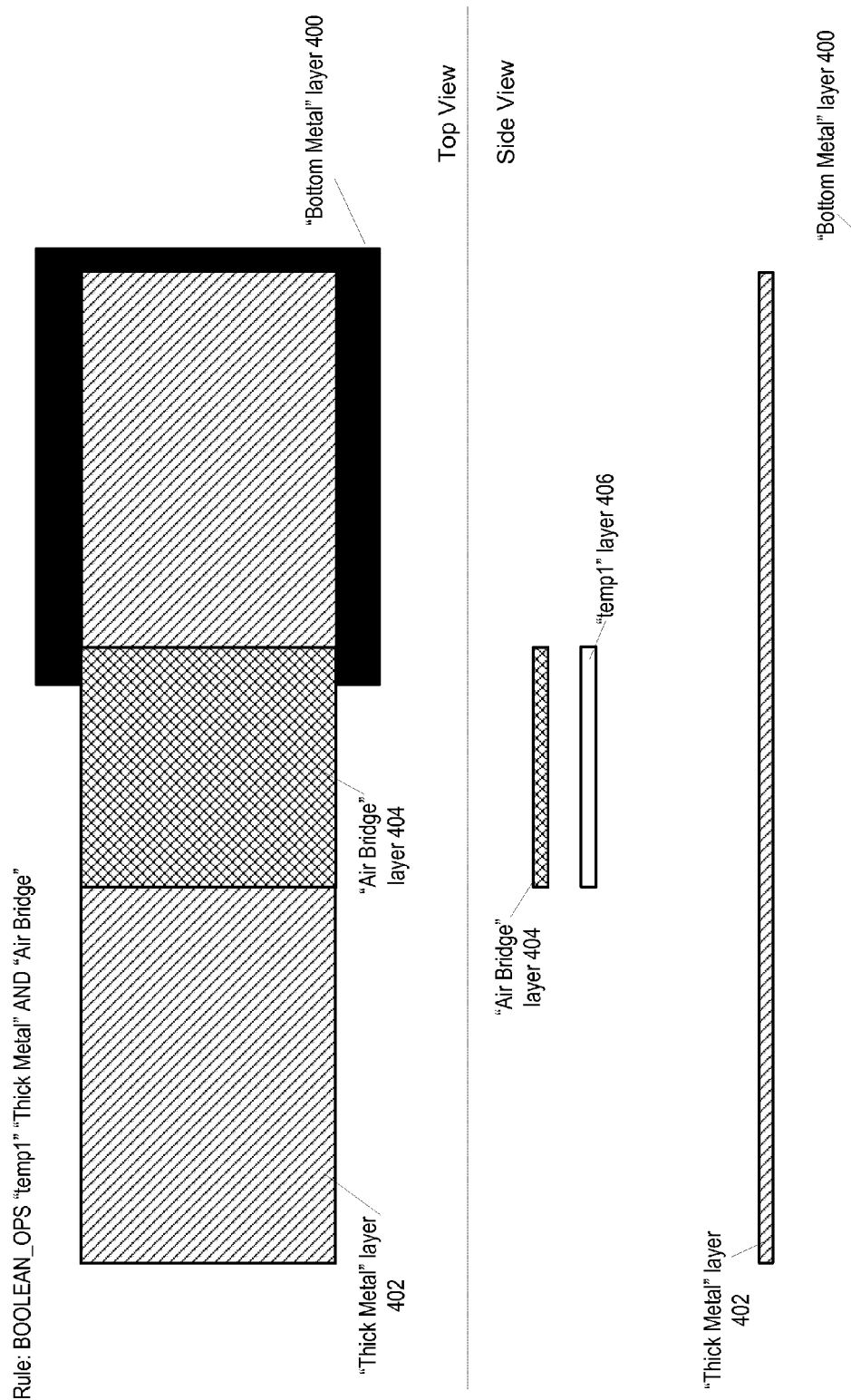
Figure 6C:
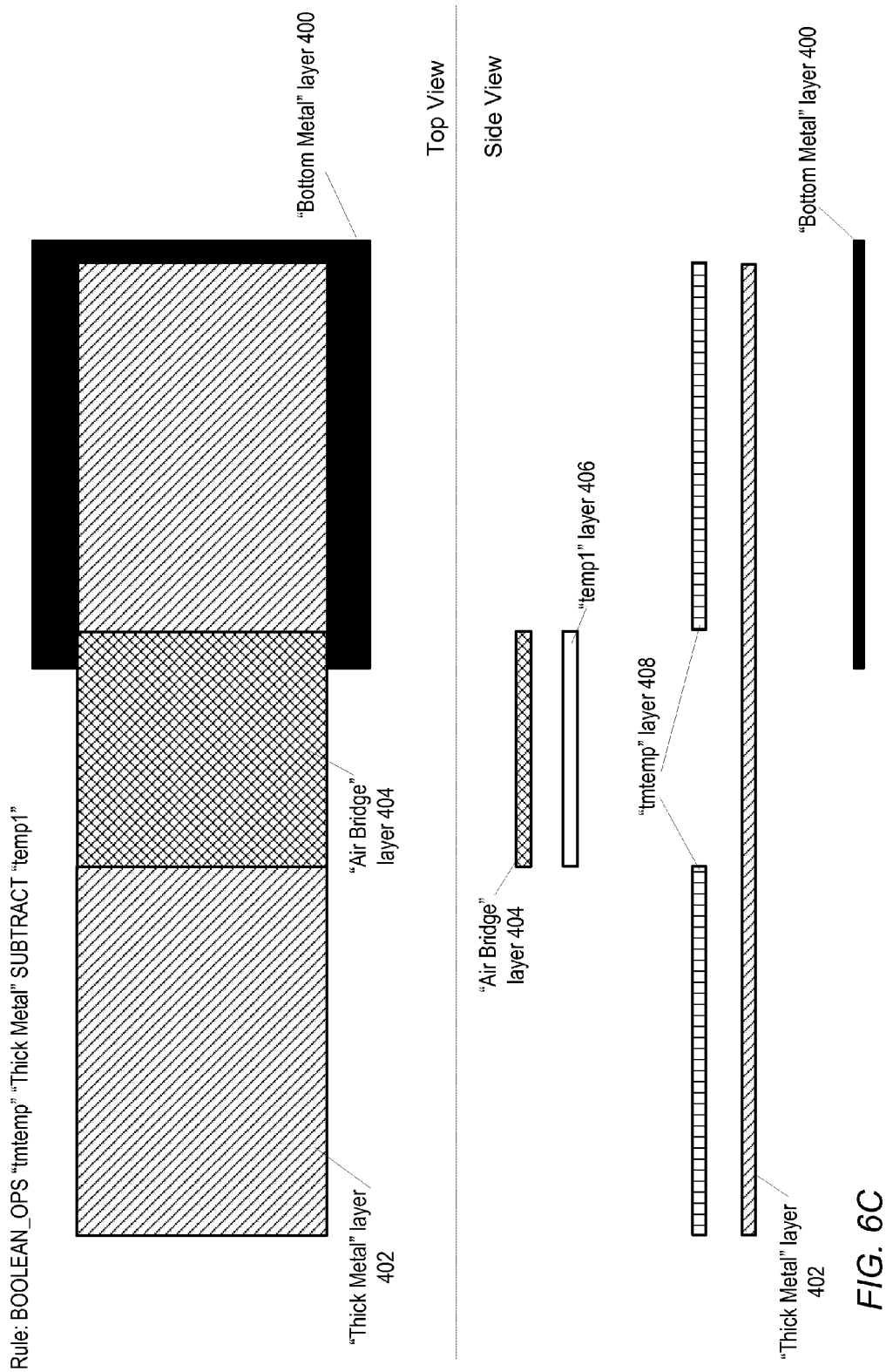

FIG. 6B illustrates the application of the rule: BOOLEAN_OPS "temp1" "Thick Metal" AND "Air Bridge"

This rule operates to create a new "temp1" layer 406 which represents the intersection of the shapes of the Thick Metal and Air Bridge layers (e.g., such that the temp1 layer has the geometric shape of the region where these two layers overlap each other). The temp1 layer is a temporary layer which will be deleted after it is no longer needed so that it is not present in the final modified layout.

FIG. 6B illustrates the application of the rule: BOOLEAN_OPS "tmtemp" "Thick Metal" SUBTRACT "temp1"

This rule subtracts the shape of the temp1 layer from the shape of the Thick Metal layer, and adds a new temporary "tmtemp" layer 408 which represents the shape resulting from this subtraction.

Figure 6D:
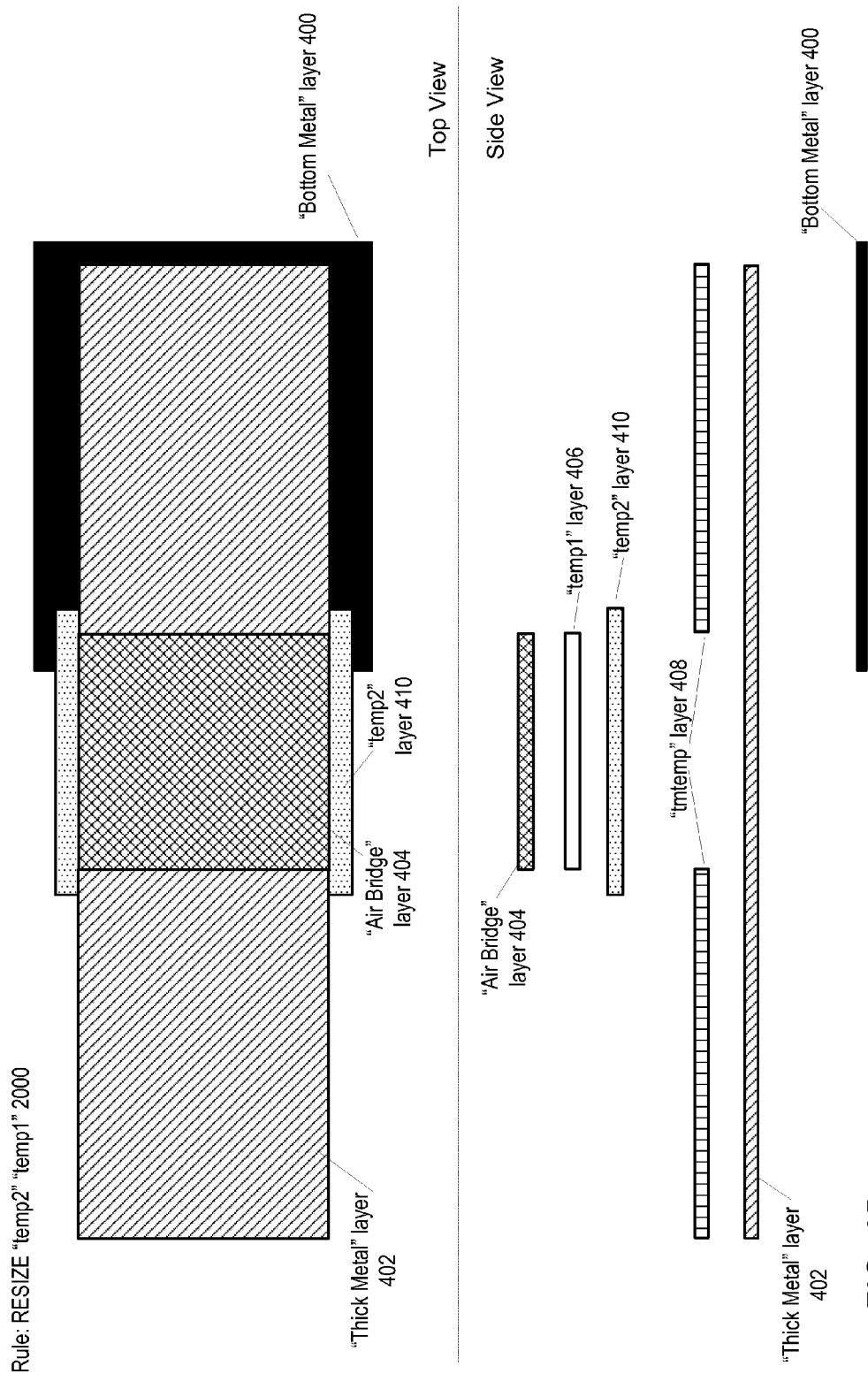

FIG. 6D illustrates the application of the rule: RESIZE "temp2" "temp1" 2000

This rule resizes the temp1 layer by 2000 units and adds a new temporary "temp2" layer 410 which represents the re-sized shape. Re-sizing the shape makes room for the vias to be added, as illustrated in the following drawings.

Figure 6E:
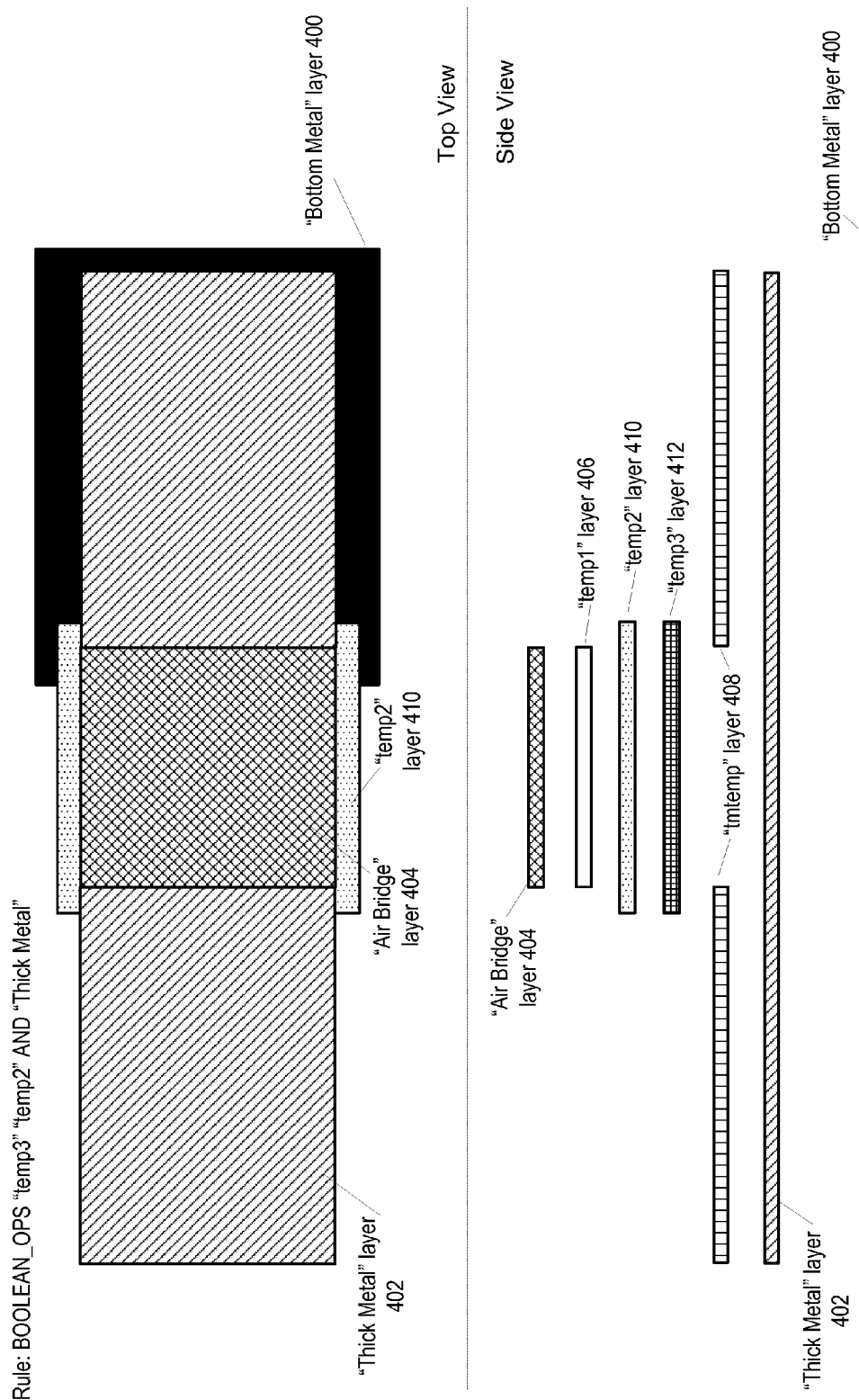

FIG. 6E illustrates the application of the rule: BOOLEAN_OPS "temp3" "temp2" AND "Thick Metal"

This rule creates a new temporary "temp3" layer 412 which represents the intersection of the shapes of the temp2 and Thick Metal layers.

Figure 6F:
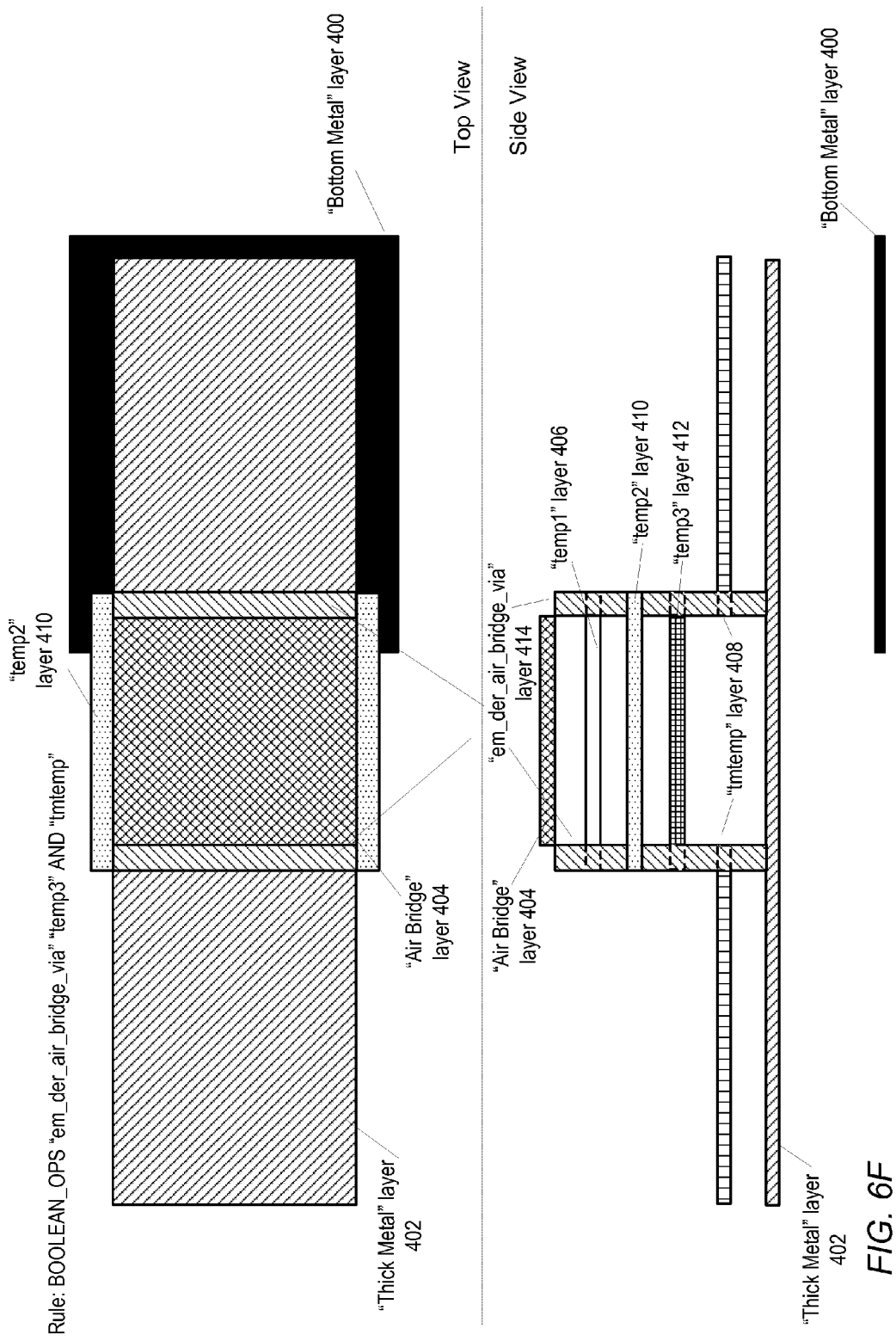

FIG. 6F illustrates the application of the rule: BOOLEAN_OPS "em_der_air_bridge_via" "temp3" AND "tmtemp"

This rule creates a new (non-temporary) em_der_air_bridge_via layer 404 which represents the intersection of the shapes of the temp3 and tmtemp layers. Although the em_der_air_bridge_via layer appears as a vertical column, this layer is actually a flat layer similar to the other layers, but has a vertical thickness that is proportionally larger than its horizontal width and length. The thickness is large enough so that it connects the Thick Metal layer to the Air Bridge layer. To specify the thickness, the rule creator may specify configuration information for the layers which specifies the thickness of the layers and their vertical and positioning within the layout with respect to the other layers.

Figure 6G:
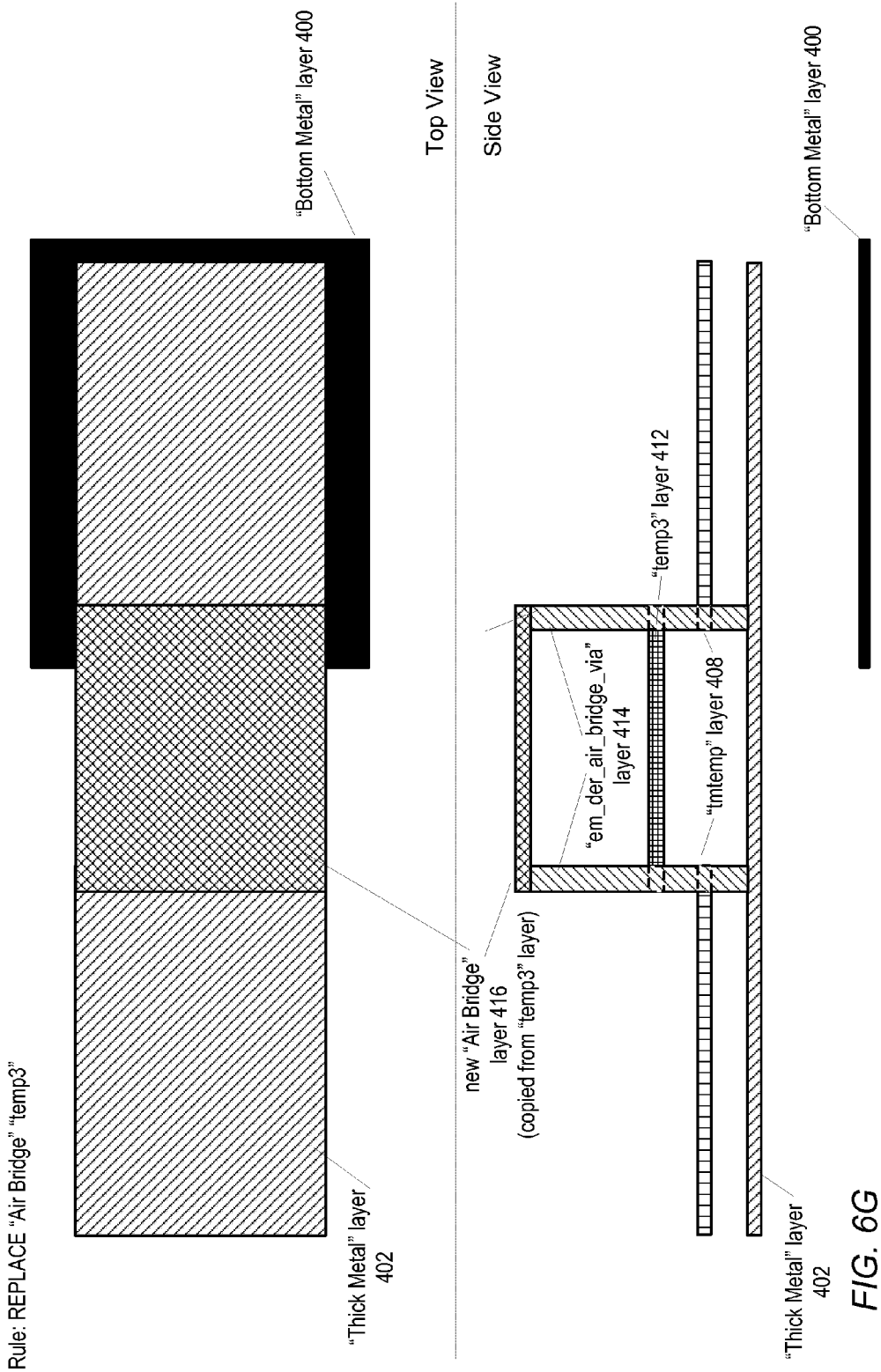

FIG. 6G illustrates the application of the rule: REPLACE "Air Bridge" "temp3"

This rule replaces the original Air Bridge layer with the shape of the temp3 layer. Note that the temp1 and temp2 temporary layers have now been deleted since they are no longer needed.

Figure 6H:
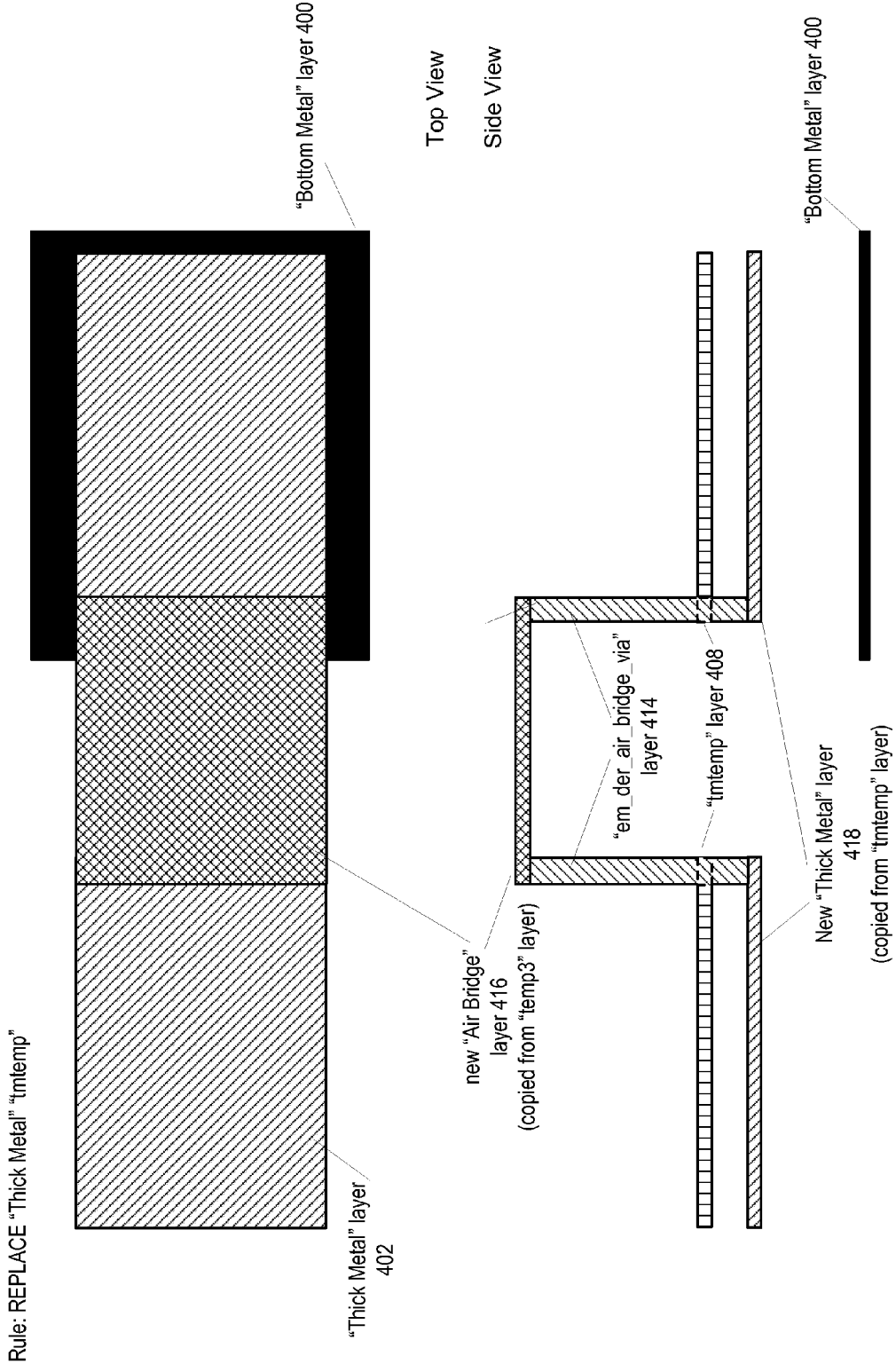
Figure 6I:
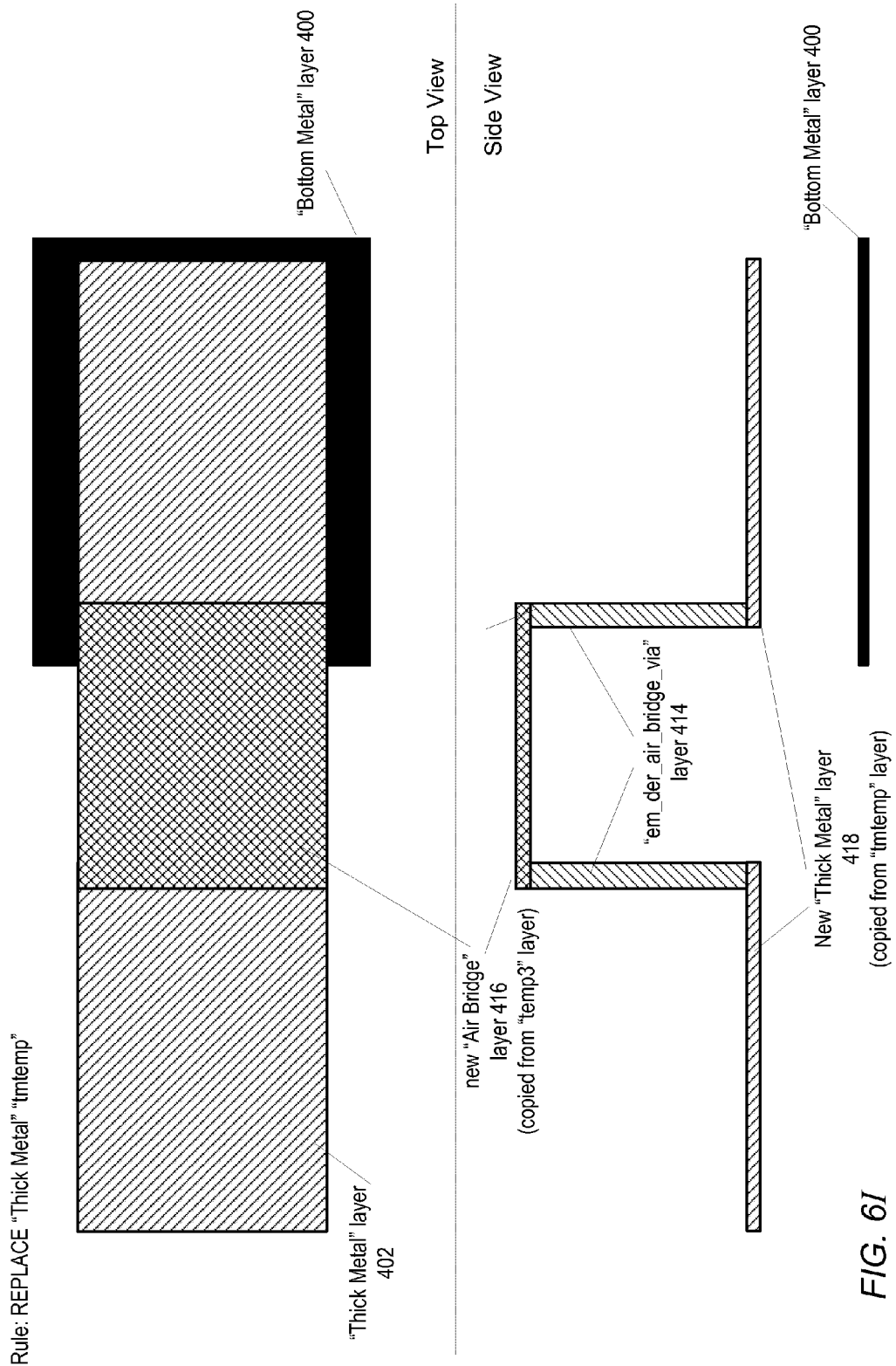

FIG. 6H illustrates the application of the rule: REPLACE "Thick Metal" "tmtemp"

This rule replaces the original Thick Metal layer with the shape of the tmtemp layer. Note that the temp3 layers has now been deleted since it is no longer needed. Next, the tmptemp temporary layer is also deleted, resulting in the final modified layout shown in FIG. 6I.

It is noted that this is a relatively simple example which illustrates the general principles involved in modifying a layout according to some embodiments. A typical real-world example may be significantly more complex. For example, the original layout may include dozens of layers, and there may be hundreds of rules which are used to modify it. There may be many regions that need to be modified in the layout, and many shapes that need to be added, removed, or re-shaped/re-sized.

Figure 7B:
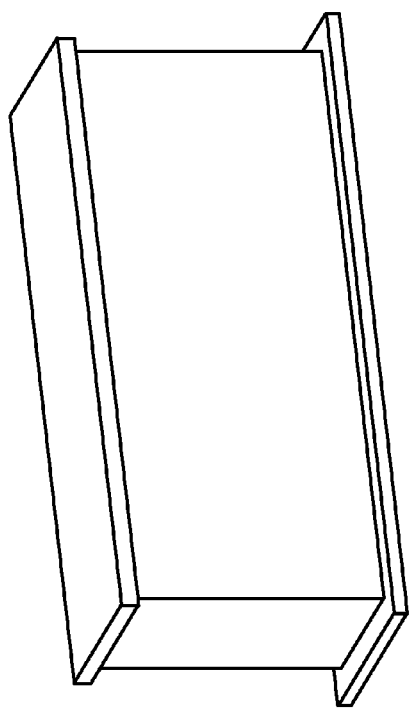
FIGS. 7A-7D illustrate another example of a set of rules which, when applied to an original layout, operate to automatically produce a simplified layout that is less complex and more accurate for EM simulation.
Figure 7A:
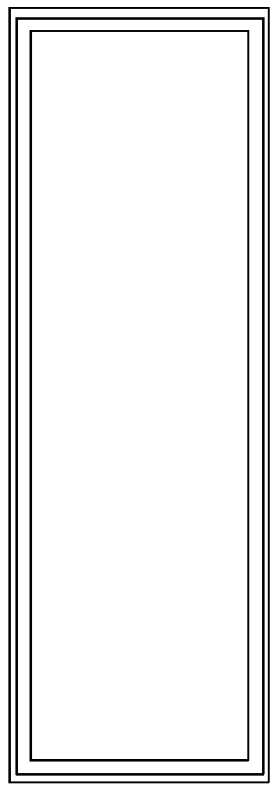
Figure 7D:
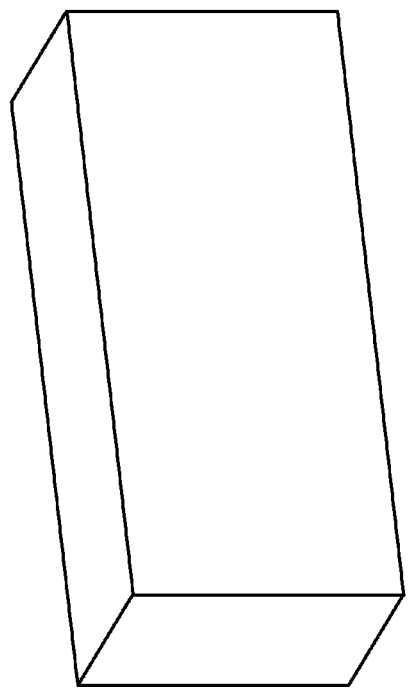
Figure 7C:
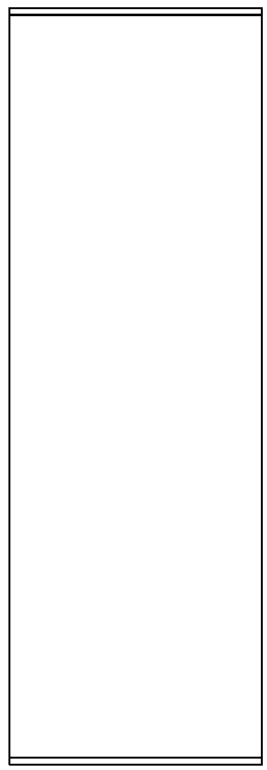

FIGS. 7A-7D illustrate another example of a set of rules which handles a platted line case, e.g., when via(s) of the platted line cannot be resized because the overall thickness of the combined layers is different than when there is no via or because all the layers have different offsets and one of the metals cannot be offset due to capacitors, etc. FIGS. 7A and 7B illustrate a top view and side view, respectively, of the original layout. FIGS. 7C and 7D illustrate a top view and side view, respectively, of the modified layout.

As shown in the differences between FIGS. 7A and 7C, some of the shapes have been removed to generate a simpler shape for simulation. This shape difference is shown more clearly in FIGS. 7B and 7D, where the shapes are reduced to a simple rectangular prism. The rules that achieved this are listed below with comments above each to say what they do:

---

!find intersection of Cap Bottom and Nitride Etch, good enough to define a plated line in this case
BOOLEAN_OPS "temp3" "Cap Bottom" AND "Nitride Etch"
!resize this new layer to be the full width of the line, em_thick_metal is a new drawing layer added and is mapped
!now have all the new layer to simulate, just need to remove other shapes at the same locations.
RESIZE "em_thick_metal" "temp3" 3000
!subtract new thick metal shape from cap bottom to new layer
BOOLEAN_OPS "cb_temp" "Cap Bottom"
SUBTRACT "em_thick_metal"
! replace new layer with original cap bottom, not needed just for the line, but would need for other structures, caps, etc.
REPLACE "Cap Bottom" "cb_temp"
! repeat the subtract and replace for the next two lines for the original plated line.
BOOLEAN_OPS "ne_temp" "Nitride Etch"
SUBTRACT "em_thick_metal"
REPLACE "Nitride Etch" "ne_temp"
BOOLEAN_OPS "tm_temp" "Thick Metal"
SUBTRACT "em_thick_metal"
REPLACE "Thick Metal" "tm_temp"

---

Figure 8A:
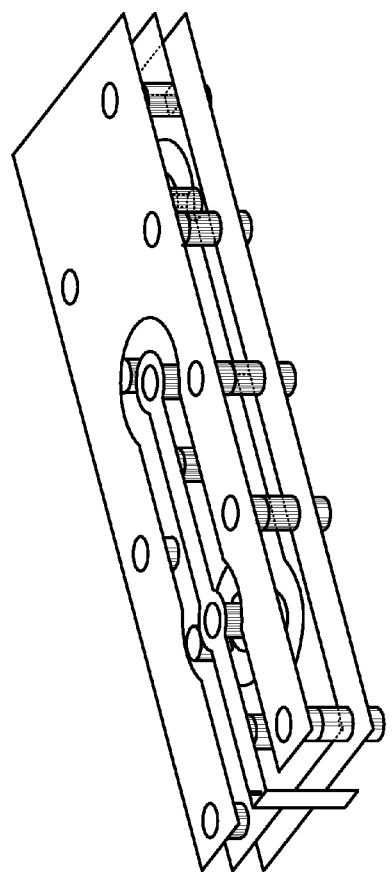
FIGS. 8A and 8B illustrate another example of an original and modified layout in which more complex circular vias are simplified into rectangular prisms.
Figure 8B:
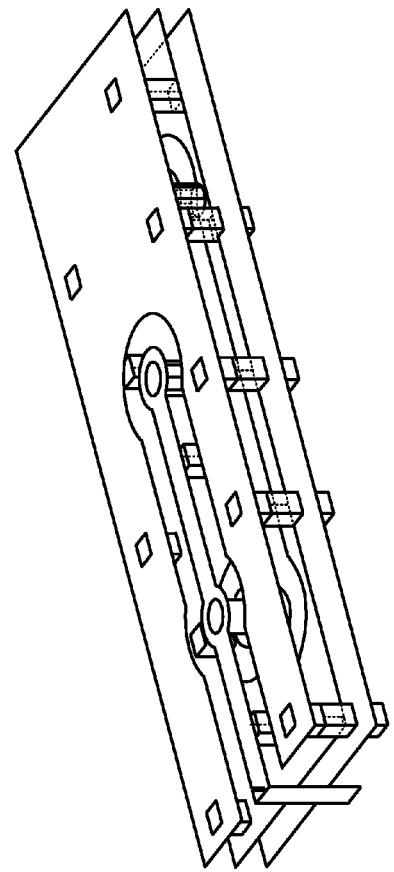

FIGS. 8A and 8B illustrate another example of an original and modified layout. In this particular example, the more complex circular VIAs in FIG. 8A have been simplified into rectangular prisms in FIG. 8B, which may greatly reduce the time required to perform EM simulation.

In addition to the examples described above, in some embodiments a set of rules may implement a port moving algorithm. More specifically, when modifying shapes, ports can be in different locations. The following is an algorithm of how this can be achieved according to some embodiments.

1) Search for shapes on (x1, y1, z) coordinate of the port (e.g., the shape should contain this coordinate), e.g., with layer restricted to original EM layer (not drawing layer)

2) If no shapes found, search on (x2, y2, z) coordinate of the port, e.g., with layer restricted to original EM layer 3) Two searches may now be conducted within these shapes for edges to attach the port:

a. Search along the perpendicular unit vector of the port, attach to nearest edge if found b. If not found, search along the parallel UV and attach to nearest c. If during any of these searches an edge with exact fit (x1, y1, x2, y2, and z) is found, attach to it (this could be a different EM layer but same z location).

4) If still no edge is found do a, b, c with no restriction on layer or z.

The priority may be given by:

1) Exact matching edge (x1, y1, x2, y2, z)

2) Nearest along perpendicular UV with same layer as long as shape contains x1, y1 or x2, y2 and same z 3) Nearest along parallel UV with same layer as long as shape contains x1, y1 or x2, y2 and same z 4) Nearest along perpendicular UV 5) Nearest along parallel UV In another embodiment, the following algorithm may be used:

1) Search for shapes on (x1, y1, z) coordinate of the port (e.g., the shape should contain this coordinate), with layer restricted to a new EM layer.

2) If no shapes found, search on (x2, y2, z) coordinate of the port, with layer restricted to a new EM layer Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method comprising:
   storing a first layout of a circuit on a non-transitory memory medium, wherein the first layout describes a plurality of vertically stacked layers used in a fabrication process to manufacture the circuit, wherein each layer corresponds to a respective step in the fabrication process, wherein the fabrication process would modify geometries of one or more of the layers and result in an electrical connection between a first layer and a second layer of the described plurality of vertically stacked layers, wherein the electrical connection is a design feature of the circuit that is not directly specified by the first layout;
   applying, by the computer, a set of rules to the first layout to automatically generate a modified layout for performing an electromagnetic (EM) simulation of the circuit, wherein the modified layout specifies a vertical electrical connection between the first layer and the second layer corresponding to the electrical connection that would result from the fabrication process, wherein the set of rules is particular to the fabrication process; and
   storing the modified layout on the non-transitory memory medium, wherein the modified layout enables the electromagnetic (EM) simulation of the circuit to be performed, including EM simulation of the electrical connection using the specified vertical electrical connection.

2. The method of claim 1,
   wherein said applying the set of rules to the first layout comprises adding a vertical interconnect access (via) to the first layout, wherein the via specifies the vertical electrical connection between the first layer and the second layer.

3. The method of claim 2,
   wherein said adding the via to the first layout comprises adding a new layer to the plurality of layers, wherein the new layer represents the via.

4. The method of claim 3, wherein said adding the new layer comprises:
   positioning the new layer between the first layer and the second layer; and
   configuring the new layer to have a vertical thickness large enough to connect the first layer to the second layer.

5. The method of claim 3,
   wherein the new layer has a vertical thickness that is proportionally larger than a horizontal width of the new layer.

6. The method of claim 2, wherein said adding the via to the first layout comprises:
   automatically determining a region where the first layer overlaps the second layer; and
   adding the via at the region.

7. The method of claim 1, wherein said applying the set of rules comprises:
   automatically creating one or more temporary layers;
   creating the vertical electrical connection between the first layer and the second layer using the one or more temporary layers; and
   deleting the one or more temporary layers.

8. The method of claim 1,
   wherein the set of rules is a particular set of rules in a plurality of sets of rules, wherein each of the sets of rules corresponds to a different fabrication process;
   wherein the method further comprises:
      automatically determining that the first layout is targeted to a particular fabrication process; and
      selecting the particular set of rules from the plurality of sets of rules in response to determining that the particular set of rules corresponds to the particular fabrication process.

9. The method of claim 1, further comprising creating the set of rules, wherein creating the set of rules comprises:
   selecting each rule of the set of rules from a library;
   configuring one or more of the rules with one or more parameters; and
   storing information specifying that the set of rules corresponds to the fabrication process.

10. The method of claim 1, further comprising:
    performing the electromagnetic (EM) simulation of the circuit using the modified layout.

11. A non-transitory memory medium storing program instructions executable by one or more processors to:
    receive a first layout of a circuit, wherein the first layout describes a plurality of vertically stacked layers used in a fabrication process to manufacture the circuit, wherein each layer corresponds to a respective step in the fabrication process, wherein the fabrication process would modify geometries of one or more of the layers and result in an electrical connection between a first layer and a second layer of the described plurality of vertically stacked layers, wherein the electrical connection is a design feature of the circuit that is not directly specified by the first layout;
    apply a set of rules to the first layout to automatically generate a modified layout for performing an electromagnetic (EM) simulation of the circuit, wherein the modified layout specifies a vertical electrical connection between the first layer and the second layer corresponding to the electrical connection that would result from the fabrication process, wherein the set of rules is particular to the fabrication process; and
    store the modified layout, wherein the modified layout enables the electromagnetic (EM) simulation of the circuit to be performed, including EM simulation of the electrical connection using the specified vertical electrical connection.

12. The non-transitory memory medium of claim 11,
    wherein said applying the set of rules to the first layout comprises adding a vertical interconnect access (via) to the first layout, wherein the via specifies the vertical electrical connection between the first layer and the second layer.

13. The non-transitory memory medium of claim 12, wherein said adding the via to the first layout comprises adding a new layer to the plurality of layers, wherein the new layer represents the via.

14. The non-transitory memory medium of claim 13, wherein said adding the new layer comprises:
 positioning the new layer between the first layer and the second layer; and
 configuring the new layer to have a vertical thickness large enough to connect the first layer to the second layer.

15. A system comprising:
 one or more processors; and
 memory storing program instructions, wherein the program instructions are executable by one or more processors to:
 receive a first layout of a circuit, wherein the first layout describes a plurality of vertically stacked layers used in a fabrication process to manufacture the circuit, wherein each layer corresponds to a respective step in the fabrication process, wherein the fabrication process would modify geometries of one or more of the layers and result in an electrical connection between a first layer and a second layer of the described plurality of vertically stacked layers, wherein the electrical connection is a design feature of the circuit that is not directly specified by the first layout;
 apply a set of rules to the first layout to automatically generate a modified layout for performing an electromagnetic (EM) simulation of the circuit, wherein the modified layout specifies a vertical electrical connection between the first layer and the second layer corresponding to the electrical connection that would result from the fabrication process, wherein the set of rules is particular to the fabrication process; and
 store the modified layout, wherein the modified layout enables the electromagnetic (EM) simulation of the circuit to be performed, including EM simulation of the electrical connection using the specified vertical electrical connection.

16. The system of claim 15, wherein said applying the set of rules to the first layout comprises adding a vertical interconnect access (via) to the first layout, wherein the via specifies the vertical electrical connection between the first layer and the second layer.

17. The system of claim 16, wherein said adding the via to the first layout comprises adding a new layer to the plurality of layers, wherein the new layer represents the via.

18. The system of claim 17, wherein said adding the new layer comprises:
 positioning the new layer between the first layer and the second layer; and
 configuring the new layer to have a vertical thickness large enough to connect the first layer to the second layer.

* * * * *